United States Patent
James et al.

(10) Patent No.: US 10,248,767 B2
(45) Date of Patent: *Apr. 2, 2019

(54) LEVERAGING A UNIFICATION OF CONTENT HOSTING AND SOCIAL NETWORKING

(71) Applicant: Google LLC, Mountain View, CA (US)

(72) Inventors: Gavin James, Los Angeles, CA (US); Justin Lewis, Marina del Rey, CA (US)

(73) Assignee: Google LLC, Mountain View, CA (US)

( * ) Notice: Subject to any disclaimer, the term of this patent is extended or adjusted under 35 U.S.C. 154(b) by 86 days.

This patent is subject to a terminal disclaimer.

(21) Appl. No.: 15/331,520

(22) Filed: Oct. 21, 2016

(65) Prior Publication Data

US 2017/0039353 A1   Feb. 9, 2017

Related U.S. Application Data

(63) Continuation of application No. 14/146,381, filed on Jan. 2, 2014, now Pat. No. 9,477,818.

(51) Int. Cl.

| | |
|---|---|
| *A63F 9/24* | (2006.01) |
| *A63F 13/00* | (2014.01) |
| *G06F 17/00* | (2006.01) |
| *G06F 19/00* | (2018.01) |
| *G06F 21/10* | (2013.01) |
| *G06F 21/62* | (2013.01) |

(Continued)

(52) U.S. Cl.
CPC .......... *G06F 21/10* (2013.01); *G06F 21/6209* (2013.01); *H04L 63/105* (2013.01); *G06F 2221/0731* (2013.01); *G06F 2221/2117* (2013.01); *H04L 67/22* (2013.01); *H04L 67/306* (2013.01)

(58) Field of Classification Search
CPC ................. G06F 21/10; G06F 21/6209; G06F 2221/0731; G06F 2221/2117; H04L 63/105; H04L 67/22; H04L 67/306
USPC ......................................................... 709/204
See application file for complete search history.

(56) References Cited

U.S. PATENT DOCUMENTS

| | | | |
|---|---|---|---|
| 7,185,364 B2 * | 2/2007 | Knouse | H04L 63/0815 709/225 |
| 7,752,438 B2 * | 7/2010 | Foster | G06F 21/6218 713/167 |
| 7,813,132 B2 | 10/2010 | Zhou et al. | |

(Continued)

OTHER PUBLICATIONS

Office Action dated Nov. 18, 2015 in U.S. Appl. No. 14/146,381.
Notice of Allowance dated Jun. 24, 2016 in U.S. Appl. No. 14/146,381.

*Primary Examiner* — Esther B. Henderson
*Assistant Examiner* — Golam Mahmud
(74) *Attorney, Agent, or Firm* — Byrne Poh LLP

(57) ABSTRACT

Content hosting architectures and/or social networking architectures can be improved by, e.g., unifying the two architectures to some extent. Services or features from both can be leveraged to provide an ecosystem that can be superior or preferred by users or consumers. For example, premium content that typically must be purchased via a transaction with the content hosting service can be accessed by certain users that have not purchased the premium content provided those users have a social relationship with one that has purchased the premium content, which can be determined based on data managed by the social networking service.

19 Claims, 11 Drawing Sheets

(51) Int. Cl.
*H04L 29/06* (2006.01)
*H04L 29/08* (2006.01)

(56) References Cited

U.S. PATENT DOCUMENTS

| | | | |
|---|---|---|---|
| 8,219,134 B2 | 7/2012 | Maharajh et al. | |
| 8,244,848 B1* | 8/2012 | Narayanan | G06Q 50/01 |
| | | | 709/218 |
| 8,265,612 B2 | 9/2012 | Athsani et al. | |
| 8,683,566 B1* | 3/2014 | Gailloux | G06F 21/31 |
| | | | 726/3 |
| 8,713,132 B2* | 4/2014 | Baum | G06F 17/30017 |
| | | | 709/217 |
| 9,059,863 B2* | 6/2015 | Baum | G06F 17/30873 |
| 9,147,042 B1* | 9/2015 | Haller | G06F 19/328 |
| 9,262,621 B1* | 2/2016 | Subbiah | G06F 21/41 |
| 9,462,003 B2* | 10/2016 | Liu | H04L 9/32 |
| 9,853,959 B1* | 12/2017 | Kapczynski | H04L 63/08 |
| 2005/0086126 A1* | 4/2005 | Patterson | A63F 13/12 |
| | | | 705/26.8 |
| 2005/0160042 A1* | 7/2005 | Russell | G06F 21/32 |
| | | | 705/50 |
| 2008/0104708 A1* | 5/2008 | Kerschbaum | G06F 21/62 |
| | | | 726/27 |
| 2008/0134295 A1* | 6/2008 | Bailey | G06F 21/41 |
| | | | 726/4 |
| 2008/0207137 A1* | 8/2008 | Maharajh | G06F 17/30035 |
| | | | 455/74 |
| 2008/0270909 A1* | 10/2008 | Kaufman | G06Q 20/12 |
| | | | 715/738 |
| 2010/0082695 A1* | 4/2010 | Hardt | G06F 17/30893 |
| | | | 707/798 |
| 2010/0287282 A1 | 11/2010 | MacLaughlin | |
| 2011/0202406 A1* | 8/2011 | Suomela | G06Q 30/02 |
| | | | 705/14.52 |
| 2011/0265157 A1* | 10/2011 | Ryder | H04L 63/10 |
| | | | 726/6 |
| 2012/0226749 A1* | 9/2012 | Dale | G06Q 50/01 |
| | | | 709/204 |
| 2012/0303703 A1 | 11/2012 | Richter et al. | |
| 2013/0086670 A1* | 4/2013 | Vangpat | H04L 9/3213 |
| | | | 726/8 |
| 2013/0103814 A1 | 4/2013 | Carrasco et al. | |
| 2013/0204664 A1 | 8/2013 | Romagnolo et al. | |
| 2014/0068735 A1* | 3/2014 | Marinov | G06F 21/31 |
| | | | 726/7 |
| 2014/0136441 A1* | 5/2014 | Agarwalla | G06Q 30/0241 |
| | | | 705/344 |
| 2014/0244752 A1* | 8/2014 | Tseng | H04N 21/26291 |
| | | | 709/204 |
| 2015/0046327 A1* | 2/2015 | Taupitz | G06Q 20/227 |
| | | | 705/44 |

* cited by examiner

US 10,248,767 B2

LEVERAGING A UNIFICATION OF CONTENT HOSTING AND SOCIAL NETWORKING

CROSS-REFERENCE TO RELATED APPLICATION

This application is a continuation of U.S. patent application Ser. No. 14/146,381, filed Jan. 2, 2014, which is hereby incorporated by reference herein in its entirety.

TECHNICAL FIELD

This disclosure generally relates to unifying content hosting and social networking and specifically to enabling access to premium or paid content based on a social network relationship with an entity that has access to the premium content.

BACKGROUND

Social networking services enable users to engage in social activities with friends, family, or other contacts with which the users have a social relationship. These relationships can be managed with a social graph. In another domain, that of content hosting, these services can enable user to upload and/or access videos or other content. In some cases, the content can be premium content.

SUMMARY

The following presents a simplified summary of the specification in order to provide a basic understanding of some aspects of the specification. This summary is not an extensive overview of the specification. It is intended to neither identify key or critical elements of the specification nor delineate the scope of any particular embodiments of the specification, or any scope of the claims. Its purpose is to present some concepts of the specification in a simplified form as a prelude to the more detailed description that is presented in this disclosure.

Systems disclosed herein relate to leveraging an advantageous unification of social networking architectures and content distribution architectures. An accounts component can be configured to manage accounts data associated with a user account of a service. The accounts data can include social data representing a social graph with respect to the user account and access data representing access privileges to premium content hosted by a content hosting service. A receiving component can be configured to receive a request to access the premium content from a device associated with a first user account including access data that indicates the first user account does not have access privileges to the premium content. An authorization component can be configured to authorize the request to access the premium content based on a determination that a social relationship exists between the first user account and a second user account. The second user account includes access data that indicates the second user account has access privileges to the premium content.

The following description and the drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

BRIEF DESCRIPTION OF THE DRAWINGS

Numerous aspects, embodiments, objects and advantages of the present invention will be apparent upon consideration of the following detailed description, taken in conjunction with the accompanying drawings, in which like reference characters refer to like parts throughout, and in which.

DETAILED DESCRIPTION

Overview

Figure 1:
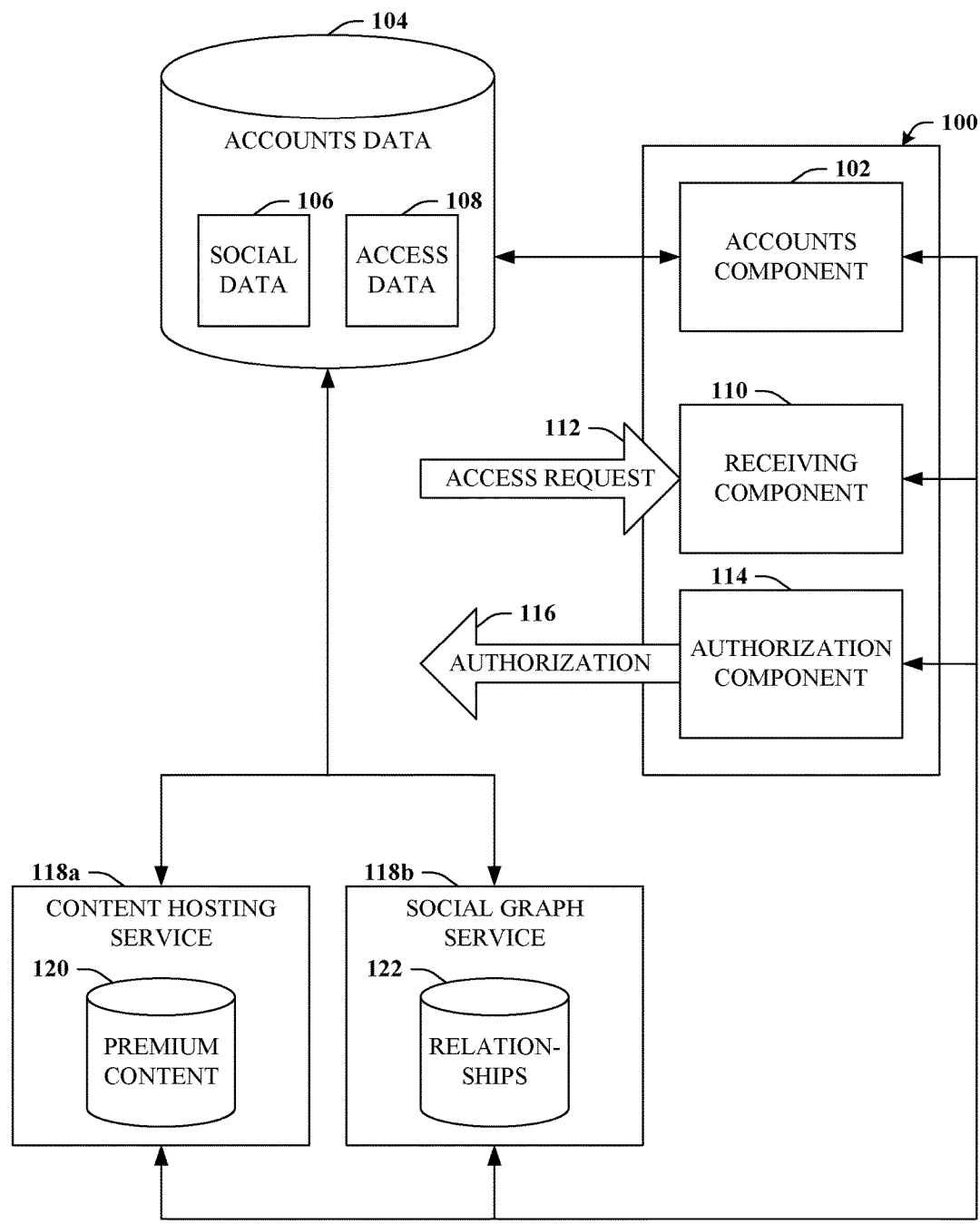
FIG. 1 illustrates a block diagram of an example system that can leverage an advantageous combination of content hosting and social networking to provide additional features or services to users in accordance with certain embodiments of this disclosure.

Today, many content hosting sites or services exist, but most are unable to offer premium content (e.g., blockbuster feature films, high-end television programs, paid channel subscription, etc.) for free, since ad revenue alone is generally insufficient to cover the expense of premium content. Further, some types of premium content is ad-free, leaving paid subscriptions as the most likely means of providing premium content. Content hosting services that rely on subscriptions engage in fierce competition to attract users to their service. Typically, it is difficult to attract consumers because few paid content services can distinguish over others in terms of the premium content that is available or in terms of price.

Some content hosting systems have attempted to solve this revenue situation with "paywalls," in which content can be identified but not accessed unless the user signs up for a subscription. However, paywalls have not worked particularly well in the marketplace, both because paywalls have proven to be relatively easy to circumvent for many kinds of content and because those with subscriptions cannot share the content with friends by, e.g., posting a link. Thus, paywalls fail in terms of being effective and in terms of successfully drawing people into the paid community.

A potential solution to this difficulty can be to unify content hosting and social networking. Such a combination can overcome existing difficulties associated with both content hosting and social networking. For example, a content hosting site can incentivize users by, e.g., allowing premium content (purchased by a user) to be shared with friends (or another social relationship) of that user. Such an incentive can operate as a form of viral marketing since users are likely to advertise their purchases or watch histories to their friends, which also overcomes a common difficulty of social networking platforms: encouraging users to share certain information (e.g., watch history) either among friends or publicly. Thus, the disclosed subject matter can readily distinguish over premium content hosting competitors to attract and keep users.

Example System That Leverage a Combination of Content Hosting and Social Networking Various aspects or features of this disclosure are described with reference to the drawings, wherein like reference numerals are used to refer to like elements throughout. In this specification, numerous specific details are set forth in order to provide a thorough understanding of this disclosure. It should be understood, however, that certain aspects of disclosure may be practiced without these specific details, or with other methods, components, materials, etc. In other instances, well-known structures and devices are shown in block diagram form to facilitate describing the subject disclosure.

It is to be appreciated that in accordance with one or more implementations described in this disclosure, users can consent to providing data in connection with data gathering aspects. In instances where a user consents to the use of such data, the data may be used in an authorized manner. Moreover, one or more implementations described herein can provide for anonymization of identifiers (e.g., for devices or for data collected, received, or transmitted) as well as transparency and user controls that can include functionality to enable users to modify or delete data relating to the user's use of a product or service.

As used herein the terms "social graph" is intended to be similar to or interchangeable with the term "social network." As used herein the term "premium content" is intended to refer to high quality content that is typically not continually offered to consumers without purchase, a subscription, or another form of payment.

Referring now to FIG. 1, a system 100 is depicted. System 100 can, inter alia, leverage an advantageous combination of content hosting and social networking to provide additional features or services to users. For example, certain privileges associated with access to premium content that is available to one user (e.g., due to a paid purchase or subscription) of a content hosting service can be extended to another user by virtue of the users sharing a social networking relationship in connection with a social graph service. System 100 can include a memory that stores computer executable components and a processor that executes computer executable components stored in the memory, examples of which can be found with reference to FIG. 9. It is to be appreciated that the computer 902 can be used in connection with implementing one or more of the systems or components shown and described in connection with FIG. 1 and other figures disclosed herein. As depicted, system 100 can include an accounts component 102, a receiving component 110, and an authorization component 114.

Accounts component 102 can be configured to manage accounts data 104 that can be associated with a user account of a service. For example, the user account can be associated a content hosting service 118*a*, a social graph service 118*b*, or a combination of such services. Hence, accounts data 104 can include social data 106 representing a social graph with respect to the user account, and access data 108 representing access privileges to premium content 120 hosted by content hosting service 118*a*. Accounts data 104 can include data relating to both content hosting service 118*a* (e.g., access data 108) and social graph service 118*b* (e.g., social data 106). As examples, social data 106 can relate to relationships 122 such as contacts, friends, family, etc. and access data 108 can relate to access privileges associated with premium content 120. Various examples of premium content 120 are provided with reference to FIG. 2.

Figure 2:
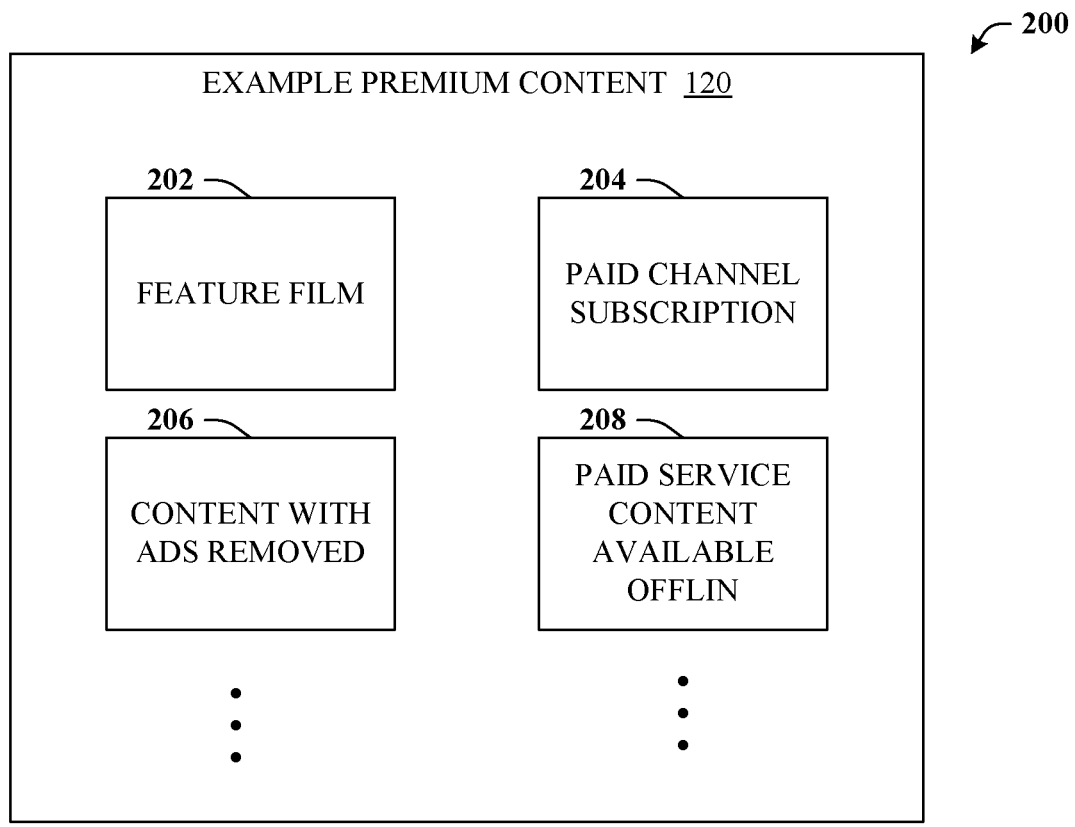
FIG. 2 illustrates a block diagram that depicts numerous examples of premium content in accordance with certain embodiments of this disclosure.

While still referring to FIG. 1, but turning now as well to FIG. 2, illustration 200 is depicted. Illustration 200 provides various examples of premium content 120. For example, premium content 120 can be a feature film 202 such as one that can be provided to authorized parties (e.g., rented, streamed, downloaded, etc.) in accordance with a purchase transaction or paid subscription. Premium content 120 can be substantially any content that is available for presentation in exchange for a paid channel subscription 204. As another example, some content can be served in a non-premium manner that includes advertisements. An associated premium content 120 version can exist in which all or a portion of such ads are removed, which is denoted by reference numeral 206. Premium content 120 can be content associated with a paid service that is available offline (e.g., music downloads, etc.), which is denoted by reference numeral 208. Numerous other examples of premium content 120 can exist, and will typically be related to content with a high production value that is normally not available for free, or unconditionally available for free, to content consumers of the associated content provider.

Continuing the description of FIG. 1, receiving component 110 can be configured to receive access request 112. Request 112 can relate to a request to access premium content 120 and can be received from a first user account including access data 108 that indicates the first user account does not have access privileges to premium content 120. Although the first user account does not have a direct privilege to access premium content 120 (e.g., has not purchased or subscribed to the content), authorization component 114 might still authorize the request.

For example, authorization component 114 can be configured to authorize request 112 to access premium content 120 based on a determination that a social relationship 122 exists between the first user account (without direct access privileges according to access data 108) and a second user account. Such might occur, for instance, if the second user account does include access data 108 that indicates the second user account has access privileges to premium content 120. Put another way, because a social relationship 122 exists between the two accounts (e.g., the accounts are marked as "friends" etc.), the first user account can be authorized to obtain the premium content 120 for content hosting service 118*a* by virtue of the friendship or other relationship 122 that is managed by social graph service 118*b*. It is understood that services 118*a* and 118*b* can be independent services or might be combined into a single, unified content hosting/social networking service. Additional detail can be found in connection with FIG. 3.

Figure 3:
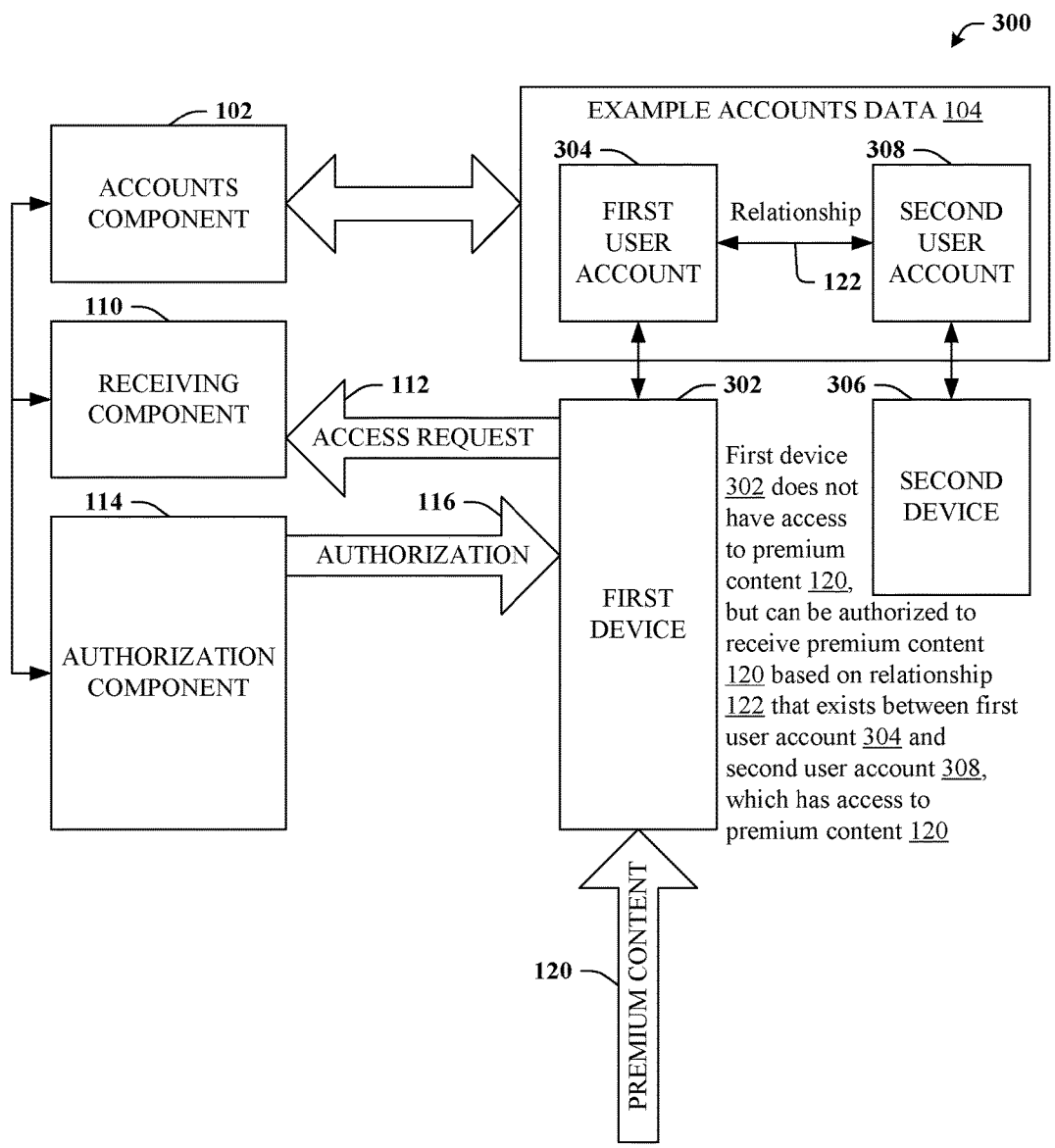
FIG. 3 illustrates a block diagram of a system that can authorize a device for receipt of premium content based on a relationship in accordance with certain embodiments of this disclosure.

Referring now to FIG. 3, system 300 is provided. System 300 can authorize a device for receipt of premium content based on a relationship. System 300 can include accounts component 102, receiving component 110, and authorization component 114 as substantially described in connection with FIG. 1, supra. As depicted, receiving component 110 can receive access request 112 from first device 302, which can be any device suitable for presenting premium content 120. First device 302 can be associated with first user account 304, which accounts component 102 can determine does not have access privileges to premium content 120.

Second user device 306 can be associated with second user account 308, which accounts component 102 can determine does have access privileges to premium content 120. Therefore, if second user device 306 requests premium content 120, such might be provided. However, in this scenario, it is not second device 306, but rather first device 302 that has requested access to premium content 120. While the conventional approach is to deny request 112 (since first device does not have access privileges), the disclosed subject matter can in some cases provide authorization 116. As previously detailed, authorization 116 can occur in response to relationship 122 (e.g., a friend status) existing between user accounts 304 and 308. In other words, a user who has purchased access privileges to premium content 120 can share that access to some degree with friends, family, followers, contacts, or another suitable relationship 122. Such can advantageously reinforce relationships associated with social networking services 118*b* as well as incentivize users of social networking services 118*b* to engage in desired behavior that might otherwise be avoided (e.g., sharing watch histories, etc.). Such can also advantageously increase the marketing for and enlarge the ecosystem of content hosting services 118*a*.

In some embodiments, authorization 116 can be limited to some extent. For instance, a friend with a lifetime subscriptions to a paid service will not likely be able to provide all the same benefits to all his or her friends. Rather, a potential compromise can exist between covering the production costs of the premium content 120 (e.g., via purchases) and attracting a loyal community with real value incentives. Various examples are further discussed in connection with FIG. 4.

Figure 4:
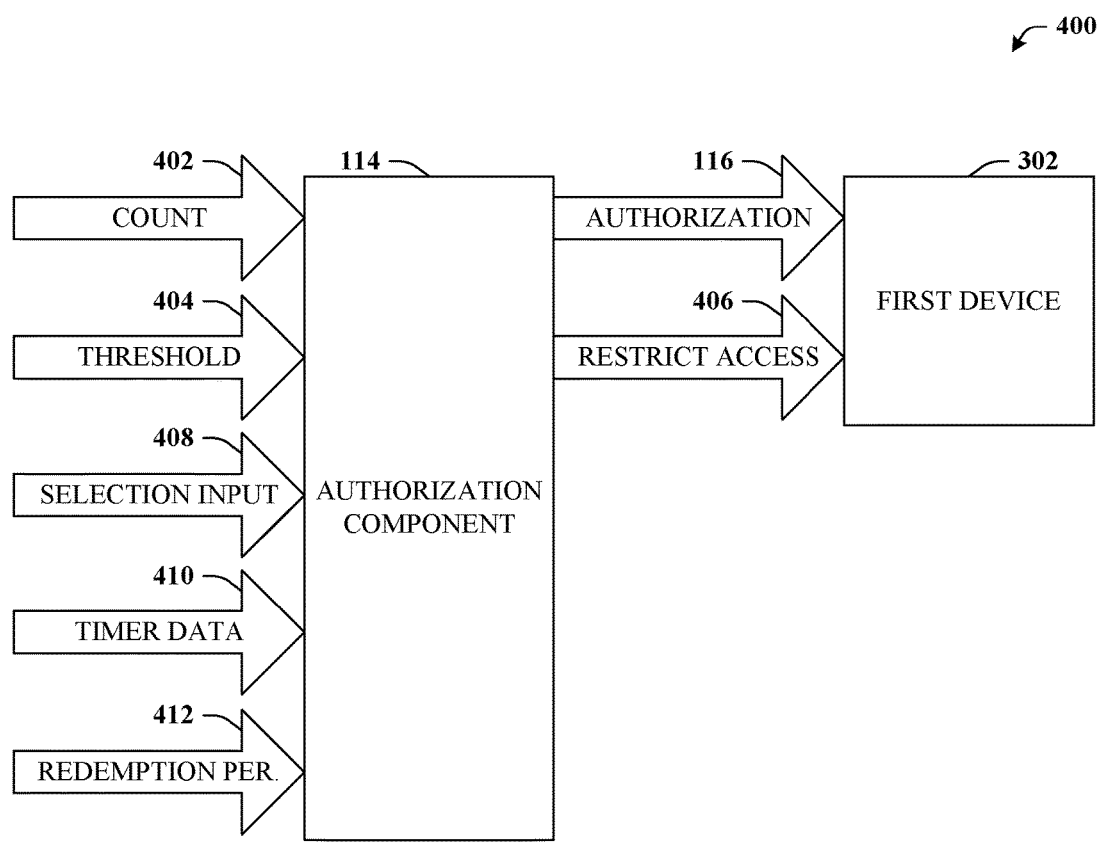
FIG. 4 illustrates a block diagram of a system that depicts additional features or aspects in connection with authorization component in accordance with certain embodiments of this disclosure.

Referring now to FIG. 4, system 400 is provided. System 400 depicts additional features or aspects in connection with authorization component 114. For example, in some embodiments, authorization component 114 can provide authorization 116 to first device 302 (that does not have direct access privileges) in response to count 402 of a number of authorizations being less than or equal to a defined maximum threshold 404. Thus, continuing the scenario introduced with reference to FIG. 3 in which second user account 308 (but not first user account 304 associated with first device 302) has access privileges to premium content 120, first device 302 can receive authorization 116, but only if fewer than some number, X, authorizations from second account 308 or for a particular instance of premium content 120 have already been authorized. Such might be exemplified by a scenario in which a user that has paid for some premium content 120 might be able to share such with up to five of his or her friends, or a particular instance of premium content 120 might be shared with the first 1000 friends of the first 100 people to purchase that particular premium content 120.

In some embodiments, authorization component 114 can provide authorization 116 to first device 302 with a restriction, denoted as restrict access 406. This restriction can be a restriction that a portion of the premium content 120 is not accessible in response to the count being greater than the defined maximum threshold 404. Thus, even if count 402 surpasses threshold 404, some of portion of premium content 120 might still be accessible.

In some embodiments, authorization component 114 can provide authorization 116 to first device 302 in response to a selection of the first user account indicated by selection input 408 received from second device 306. For example, second device 306, which is associated with second user account 308 that does have access privileges might specifically identify a particular friend (e.g., first user account 304) to which his or her access privileges are to be extended. Hence, authorization component 114 might not provide authorization 116 to all friends of the authorized party, but rather only to those that have been so identified, which can be a special category of relationship 122 (e.g., friends with designated access).

In some embodiments, authorization component 114 can provide authorization 116 to first device 302 in response to a timer associated with a redemption period being unexpired. In this scenario, access privileges that can be extended to first device 302 might be limited by time, which might be related to a period after the privileges are extended, a period after the premium content 120 becomes available or eligible for certain incentives, a period relating to a purchase associated with the second user account 306, or some other suitable period. Such can be determined based on a comparison of timer data 410 to redemption period 412.

Figure 5A:
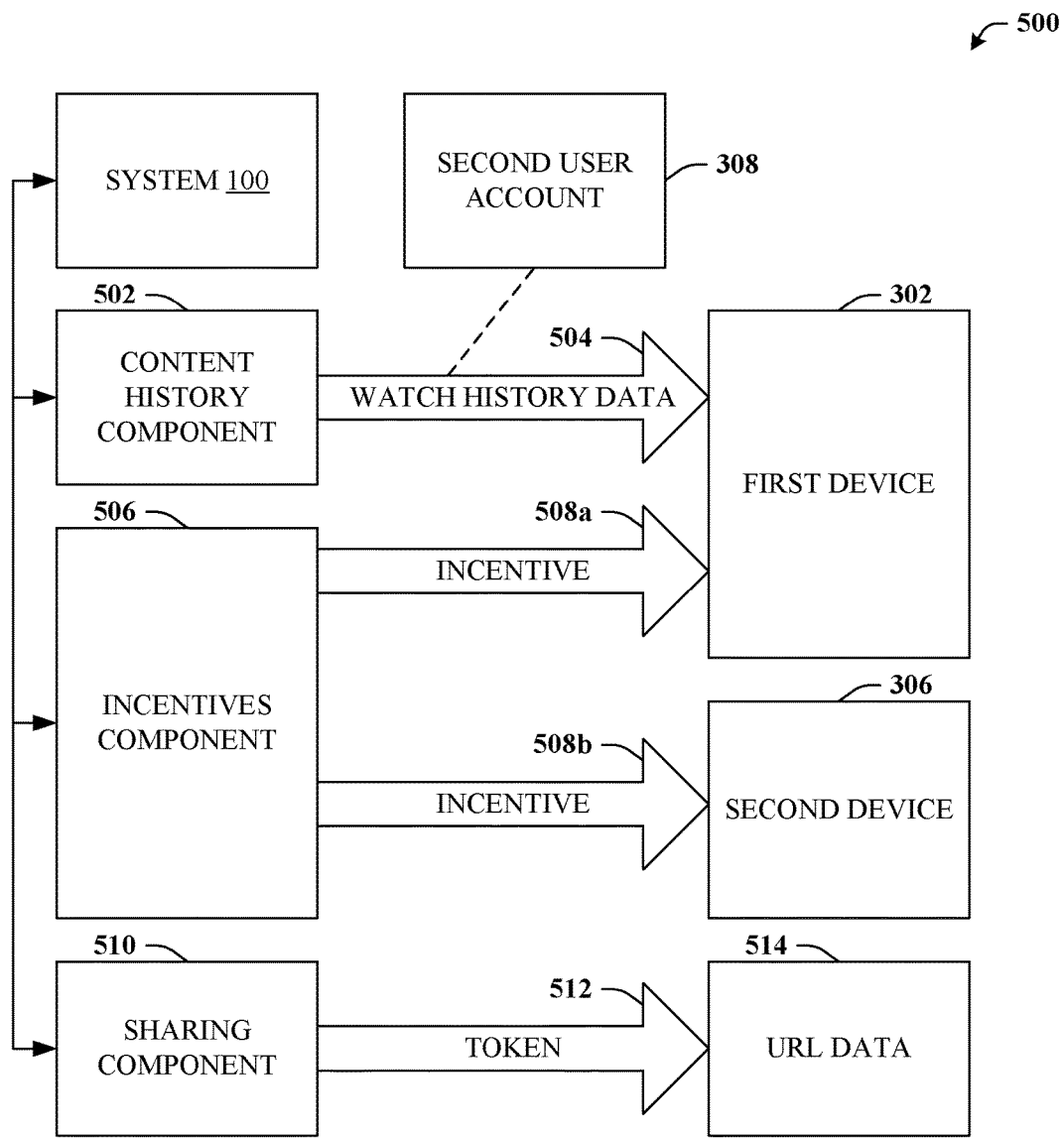
FIG. 5A illustrates a block diagram of a system that can provide for additional features or aspects in connection with an advantageous combination of content hosting and social networking in accordance with certain embodiments of this disclosure.

Turning now to FIG. 5A, system 500 is depicted. System 500 can provide for additional features or aspects in connection with an advantageous combination of content hosting and social networking. In general, system 500 can include all or a portion of system 100 or other systems or components detailed herein. System 500 can include content history component 502 that can be configured to present to first device 302 (that is associated with first user account 304) watch history data 504 representing a history of premium content 120 for which the second user account 308 has access privileges. Thus, all or a portion of premium content 120 that has been purchased or subscribed to via second user account 308 can be viewed by friends or certain authorized parties, typically determined based on relationship 122. Such can serve as an advertisement for the premium content and given such relates to content purchased by friends, the advertisement can be vetted to a degree and have an additional degree of trust. It is understood that a user associated with the second user account 308 might be encouraged to share watch history data 504 (either publicly or with friends) in order to allow others to gain access to his or her purchased premium content 120 as well as personal ratings or remarks associated with the premium content 120.

System 500 can include incentives component 506 that can be configured to provide various incentives 508. In some embodiments, the incentive (e.g., incentive 508*a*) can be provided to first device 302. In some embodiments, the incentive (e.g., incentive 508*b*) can be provided to the second device 306. Typically, the incentive will relate to or be in response to a purchase transaction in connection with the premium content 120. Thus, if first device 302 facilitates a purchase of some premium content 120 (e.g., after receiving other premium content without a purchase based on relationship 122 with second user account 308), then either or both devices 302, 308 can receive one or more incentive 508.

System 500 can also include sharing component 510 that can be configured to insert a token 512 into uniform resource locator (URL) data 514 representing a link to premium content 120. Token 512 can include identification data that identifies second user account 308 (e.g., an account that has direct access to the premium content 120). Such can operate as a mechanism for sharing premium content 120, e.g., among friends. For example, a user that has paid for certain premium content 120, e.g., a feature film, can copy the URL to the content then paste that link to a suitable forum such as a blog or social networking forum. Sharing component 510 can insert token 512 into the URL such that when one clicks the link, the content hosting service can identify the user account with access to premium content. The user that clicked the linked might be signed in to the content hosting service with his or her own credentials and in some cases it can be verified that both users have a suitable relationship 122.

With the foregoing in mind, various non-limiting example implementations are now described to provide concrete illustrations. As is readily apparent, the disclosed subject matter can provide mechanisms for sharing purchased content or purchased feature (e.g., no ads) with friends. For instance, premium content can be a purchased video rental or a coupon for content playback. The disclosed subject matter can be employed with a variety of different products and platforms or architectures. For example, in the case of existing content hosting services, the disclosed subject matter can be particularly useful in connection with buying or renting streamed video or audio; paid subscriptions to one or more channels; paid service for no-ad content delivery; paid service to watch music videos or other content offline and so on.

In some embodiments, the disclosed subject matter can include a set of restrictions so that the shared nature of the content is not exploited by industrious individuals. For example, the disclosed architectures can include a mechanism to ensure only the first X number of friends can access the content or coupon for the premium content. As another example, a mechanism can exist to ensure the purchaser can reserve spots for specific friends. Additionally or alternatively, a time-based mechanism can be included in which access to the premium content might only be claimed within a defined period of time.

In some embodiments, the initial purchaser of the premium content might receive a discount, credit, or bonus content if one or more of his or her friends also opt into purchasing the premium content or similar premium content. For example, one user might pay for a monthly subscription and can share that monthly subscription with one or more friends, but perhaps on a limited basis such as the friends might only receive one week of the premium content. Additionally or alternatively, for instance, as an additional incentive, perhaps both users might receive a bonus month subscription to a different paid channel.

In some embodiments, a first user might pay for a no-ad experience for a month. The first user can then be offered a means of sharing this no-ad experience with his or her friends. This sharing can be unlimited or limited to a set number of friends or for a defined time period, or might be available only to friends that are specifically selected by the first user. In some cases, the friends might receive the no-ad experience for a limited time. Whether shortened or not, during the time the friend receives the no-ad experience, some portion of ads that might otherwise appear can be replaced with notices such as "this video is brought to you ad-free because of <name of friend> paid for the ad free service and wanted you to try it too!" Such can strongly encourage users to publicize their purchases (or watch history) and can also enable content hosting services to generate socially annotated versions of the above-mentioned advertisements for the no-ad experience product.

As another example embodiment, consider a content hosting service user who purchases a subscriptions to a particular channel. When that user shares a video from this channel, a token can be included in the shared URL. In other systems, particularly those that implement paywall-style mechanisms, when another user clicks on this shared video link, the actual content is not accessible because the other user has not paid for content from that channel. However, in accordance with the disclosed subject matter, the token can be used to identify which user the shared video link was generated by, and to enable some first number, X, of others that click the link to access the video. Those that click the link can be identified either by their existing signed in state or by extra information stored in their cookies. Accordingly, users are encouraged to share the content for which they have purchased and/or viewed given their friends are able to access content that would otherwise be inaccessible to them. Moreover, the content hosting service is afforded the opportunity to directly or indirectly employ the purchases of users as an advertisement for additional purchases.

These and other implementations or scenarios can be quite advantageous for providers of content hosting and social networking. These advantages can be obtained by systems with a social graph in which a purchasing user is a part of, an event feed that advertises either content the user has shared or events or actions the user has engaged in, and a content purchasing or ownership mechanism. One distinction over existing systems is that no social networking service today has a fully realized content purchasing portal. Likewise, other existing content hosting or content purchasing portal has a fully realized social network.

It is understood that the payment mechanisms detailed herein can vary. For example, in some embodiments, payment can take the form of credit card transactions, which might be coupled with a refund mechanism in the case of referral kickbacks. In other embodiments, payment might take the form of a credit mechanism. The latter might be particularly useful in the case of kickbacks to the sharer because such can ensure that the sharing user continues to purchase content on the network.

Figure 5B:
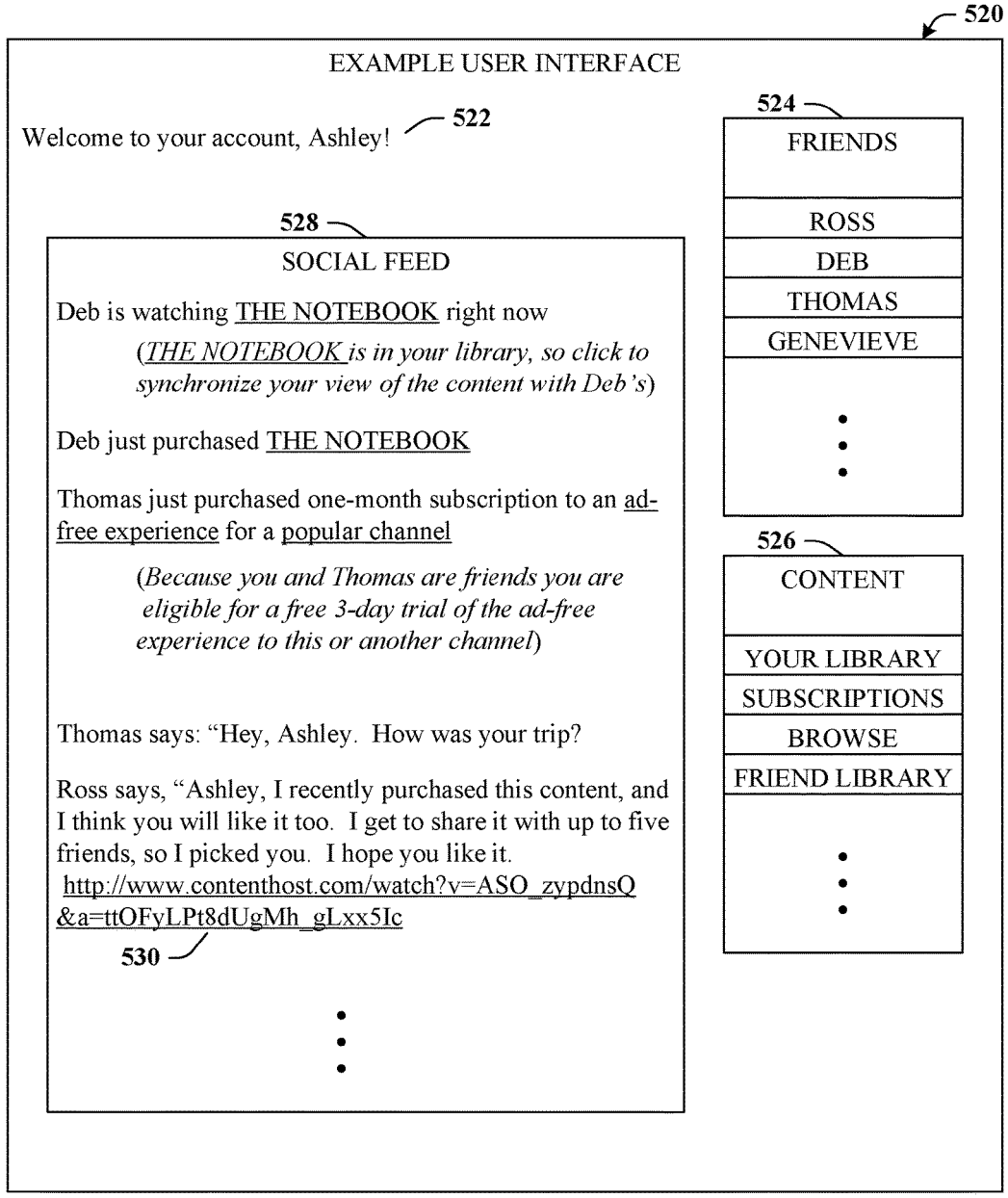
FIG. 5B illustrates a graphic depiction of an example user interface in connection with logging into a user account in accordance with certain embodiments of this disclosure.

Referring now to FIG. 5B, graphical illustration 520 is depicted. Graphical illustration 520 provides an example user interface that can be presented upon logging into an account such as an account for content hosting service 118a, social graph service 118b, or a unified service. In this example, a user, Ashley, logs into her account with an online service and her device presents a welcome message depicted by reference numeral 522. The presentation can also include a list of friends or contacts or other entities with which Ashley has a social relationship, denoted by reference numeral 524. In this example, Ross, Deb, Thomas, and Genevieve, etc. are friends with Ashley. The presentation can also include a content 526 section. This section can list or link to various content, subscriptions, etc. that have been purchased by Ashley, a mechanism for browsing content available for purchase, browse libraries associated with friends, or the like.

Illustration 520 can also include a social feed 528 section. Social feed 528 can include messages from friends, or any other post suitable for social networking services. In addition, various content-specific items can be presented, either automatically or based on input from a user. In this example, elements of social feed 528 are listed in reverse chronological order. Starting from the bottom, a message can be presented from Ross. Ross indicates he purchased some content. Due to that purchase, Ross might be entitled to share the content he purchased with friends, like Ashley. Here, Ross provides a link to the content. The first line identifies the actual link to the content, and the second line (e.g., "&a=ttOFyLPt8dUgMh_gLxx5Ic") denoted by reference numeral 530 represents a token (e.g., token 512) that can identify Ross as the entity who provided the link. Hence, no matter where Ross posts this link, even if posted to a site or service that is not associated with content hosting service 118*a*, the token can be used to determine various information such as how many times Ross has shared the content. In this example, Ross is limited to sharing it five times, so the token can be employed to track such information.

The next two posts to social feed 528 are from Thomas. The first post is customary for social networking services, where Thomas inquires how Ashley's recent trip went. The second post relates to content purchased by Thomas. This second post might be automatically generated in response to Thomas's purchase of the one-month subscription to an ad-free experience in connection with some popular channel. These or other posts might be contingent on Ross agreeing to allow his purchase history to be provided to others, such as to his friends, like Asley. Ashley might also receive a system-generated note that because she and Thomas are friends, she is eligible for a free three-day trial of the ad-free experience. The trial might only be associated with the same channel, or might be associated with another channel such as one by the same content provider or affiliate.

Continuing later in time, the next post indicated that Ashley's friend Deb just purchased a feature film entitled "The Notebook". Soon after the purchase, Deb begins watching the film, and an associated post might appear in response. In this case, Ashley has already purchased that content (e.g., in her library), so a system-generated message indicates the option to synchronize her view of the film with that of Deb. Such might provide a shared experience that is more fulfilling that watching the film independently. For example, if Ashley does choose to sync the presentation of the film, Deb might receive a notification and the two might exchange private messages during the presentation, e.g., "I love this part," or the like. It is understood the option to sync views of content is not dependent on both parties having purchased the content. For example, Ashley might be able to view the film by virtue of being Deb's friend since Deb purchased the content, and might sync the view in that case as well, or the condition for sharing with friends might require that the views be synchronized.

Figure 6:
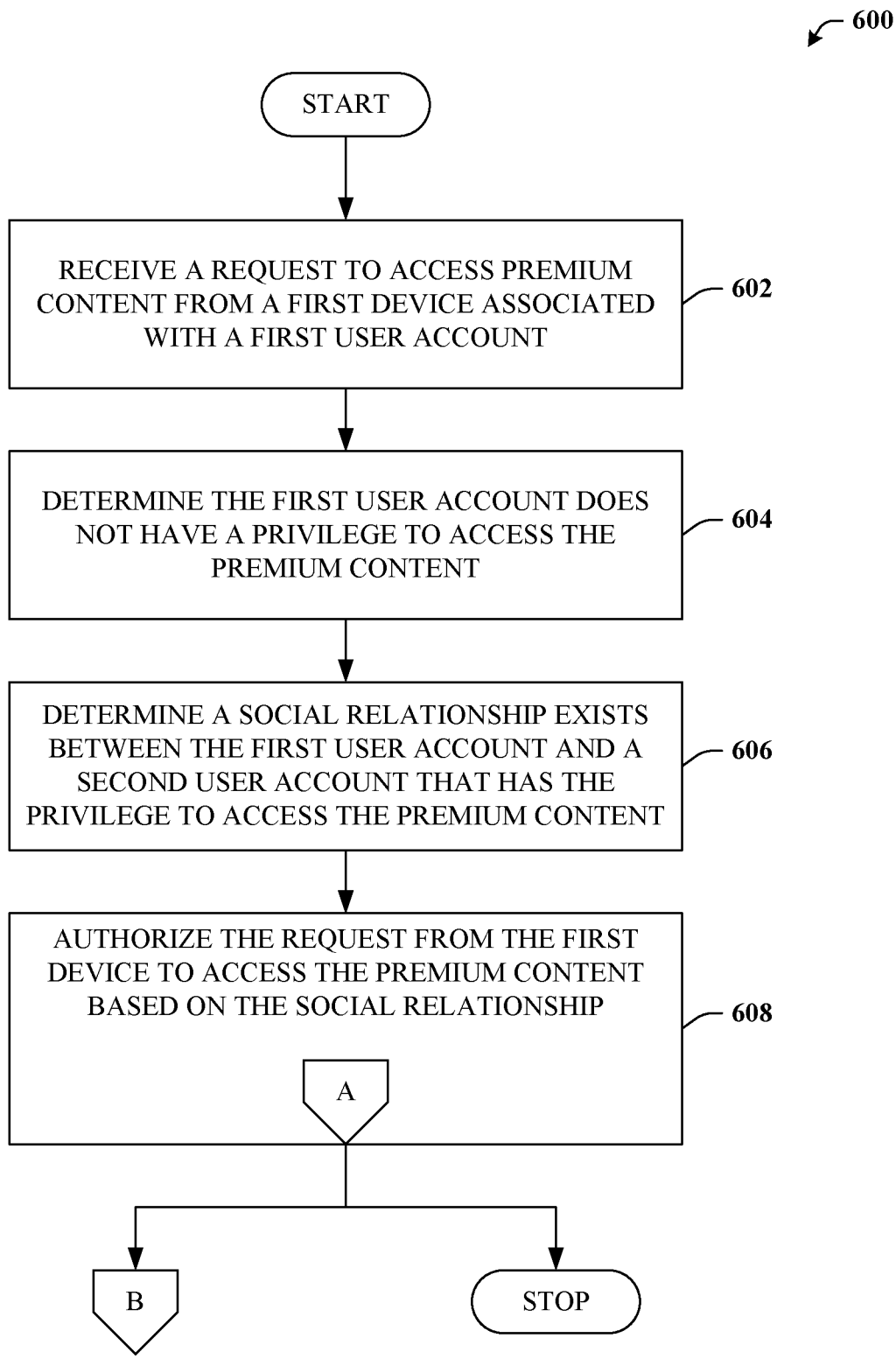
FIG. 6 illustrates an example methodology that can provide for leveraging an advantageous combination of content hosting and social networking to provide additional features or services to users in accordance with certain embodiments of this disclosure.
Figure 7:
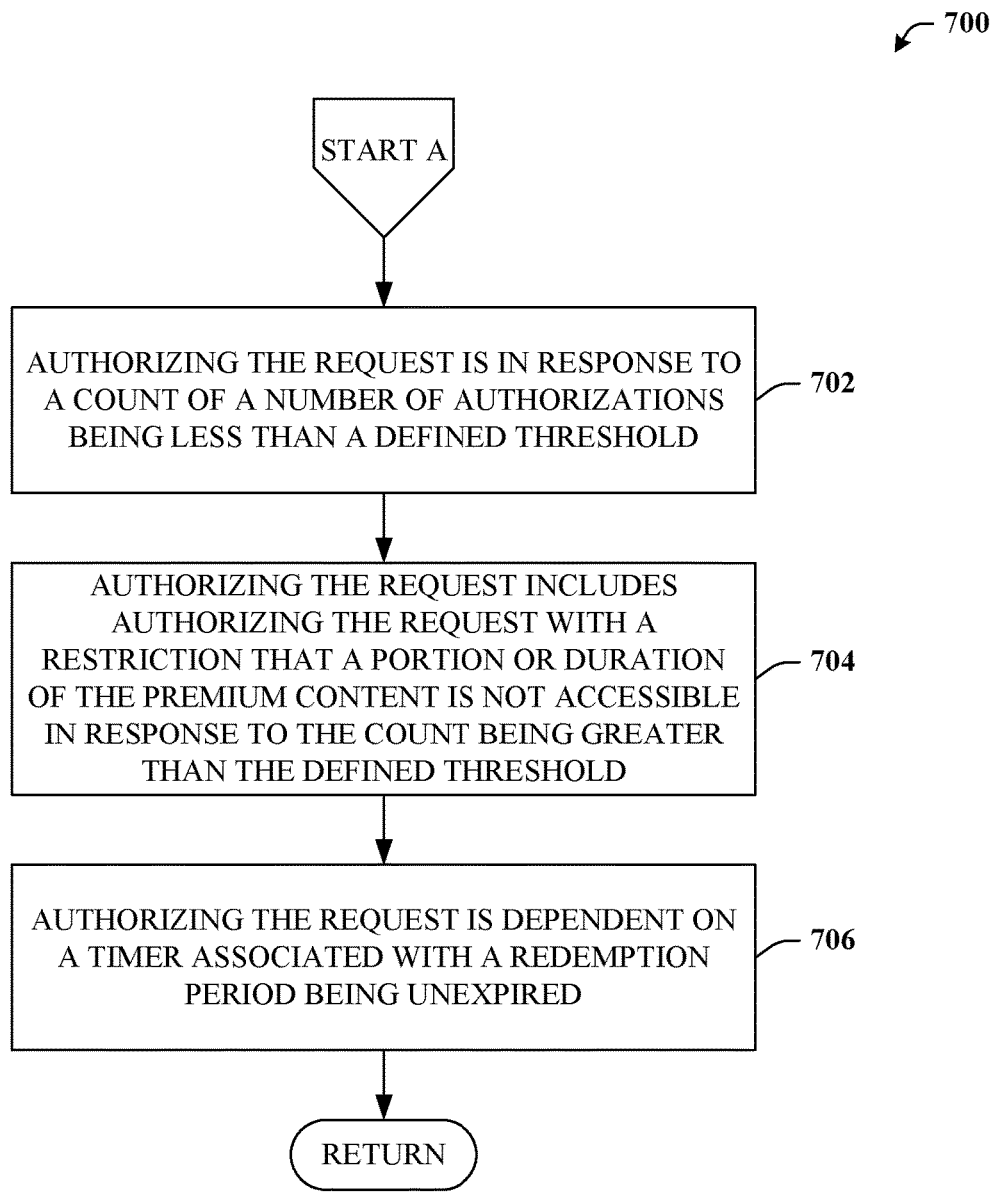
FIG. 7 illustrates an example methodology that can provide for additional features or aspects in connection with authorizing the request in accordance with certain embodiments of this disclosure.
Figure 8:
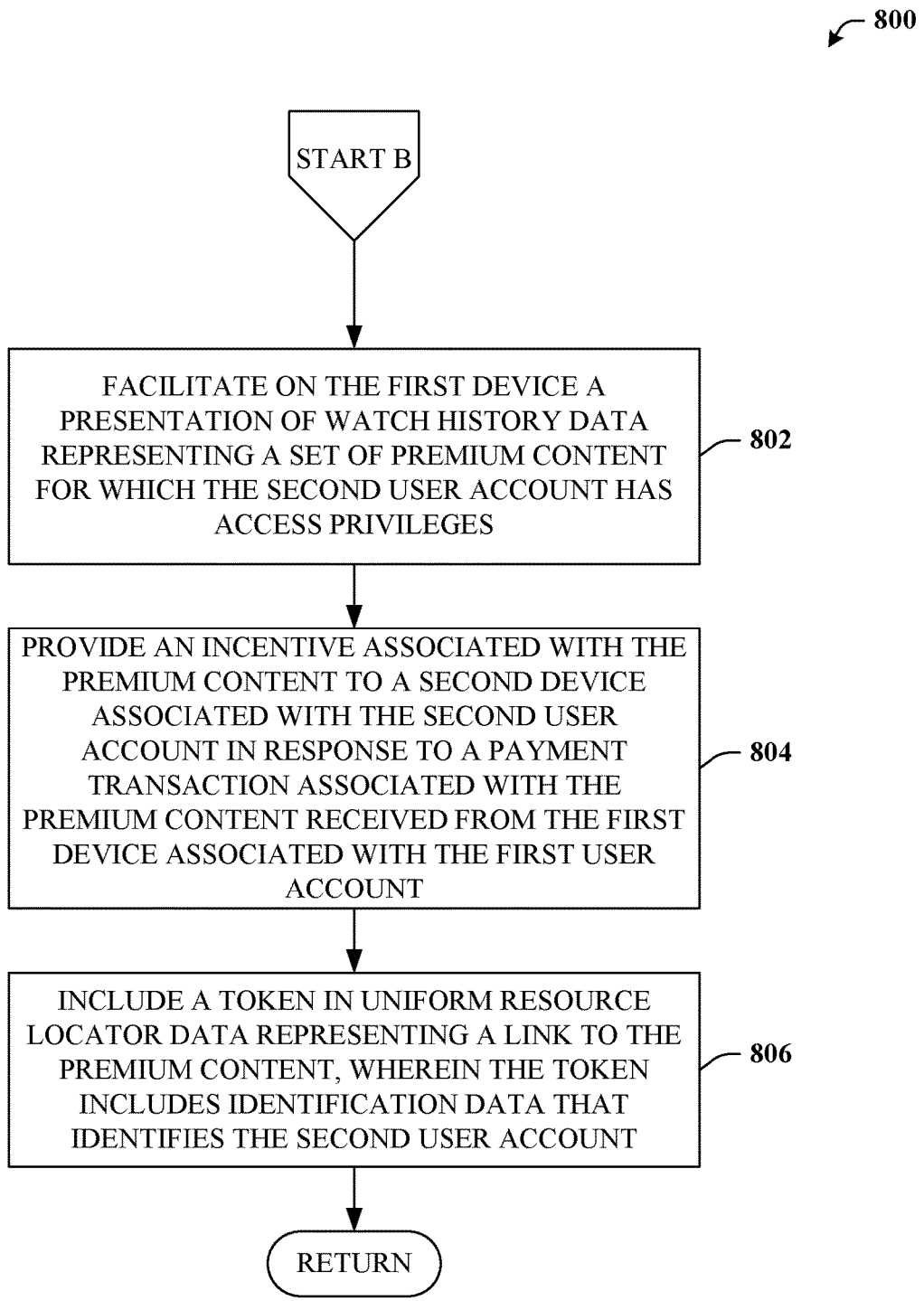
FIG. 8 illustrates an example methodology that can provide for additional features or aspects in connection with a provision of additional features or aspects to users in accordance with certain embodiments of this disclosure.

Example Methods for Leveraging a Combination of Content Hosting and Social Networking FIGS. 6-8 illustrate various methodologies in accordance with certain embodiments of this disclosure. While, for purposes of simplicity of explanation, the methodologies are shown and described as a series of acts within the context of various flowcharts, it is to be understood and appreciated that embodiments of the disclosure are not limited by the order of acts, as some acts may occur in different orders and/or concurrently with other acts from that shown and described herein. For example, those skilled in the art will understand and appreciate that a methodology can alternatively be represented as a series of interrelated states or events, such as in a state diagram. Moreover, not all illustrated acts may be required to implement a methodology in accordance with the disclosed subject matter. Additionally, it is to be further appreciated that the methodologies disclosed hereinafter and throughout this disclosure are capable of being stored on an article of manufacture to facilitate transporting and transferring such methodologies to computers. The term article of manufacture, as used herein, is intended to encompass a computer program accessible from any computer-readable device or storage media.

FIG. 6 illustrates exemplary method 600. Method 600 can provide for leveraging an advantageous combination of content hosting and social networking to provide additional features or services to users. For example, at reference numeral 602, a request to access premium content can be received (e.g., by a receiving component) from a first device associated with a first user account. At reference numeral 604, it can be determined (e.g., by an accounts component) that the first user account does not have a privilege to access the premium content associated with the request.

However, rather than refusing the request, at reference numeral 606, it can be determined (e.g., by the accounts component) that a social relationship exists between the first user account and a second user account that has the privilege to access the premium content. In response to this latter determination, at reference numeral 608, the request from the first device can be authorized (e.g., by an authorization component) to access the premium content based on the social relationship.

FIG. 7 illustrates exemplary method 700. Method 700 can provide for additional features or aspects in connection with authorizing the request as detailed at reference numeral 608 of FIG. 6. For example, at reference numeral 702, the authorizing the request can be in response to a count of a number of authorizations being less than a defined threshold. For example, the request can be authorized if less than a defined number of other requests have already been authorized.

At reference numeral 704, the authorizing the request can include authorizing the request with a restriction that a portion or a duration of the premium content is not accessible in response to the count being greater than the defined threshold. Put another way, even if the request is not authorized fully as detailed at reference numeral 702 due to too many other requests already being satisfied, then a limited or restricted authorization can still occur. Such might relate to a limited duration, a limited portion of the premium content, or the like.

At reference numeral 706, the authorizing the request can be dependent on a timer associated with a redemption period being unexpired. For example, a redemption period might exist and authorization for access to the premium content can depend upon whether or not that redemption period has expired.

Turning now to FIG. 8, exemplary method 800 is depicted. Method 800 can provide for additional features or aspects in connection with a provision of additional features or aspects to users. At reference numeral 802, a presentation of watch history data representing a set of premium content for which the second user account has access privileges can be facilitated (e.g., by a content history component) on the first device.

At reference numeral 804, an incentive associated with the premium content can be provided (e.g., by an incentives component) to a second device associated with the second user account in response to a payment transaction associated with the premium content received from the first device associated with the first user account. Additionally or alternatively, an additional incentive can be provided to the first user device as well.

At reference numeral 806, a token can be included (e.g., by a sharing component) in uniform resource locator (URL) data representing a link to the premium content. The token that is included in the URL data can include identification data that identifies the second user account (e.g., the originator of the URL and/or the account that has direct access privileges to the premium content).

Example Operating Environments

The systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which may be explicitly illustrated herein.

Figure 9:
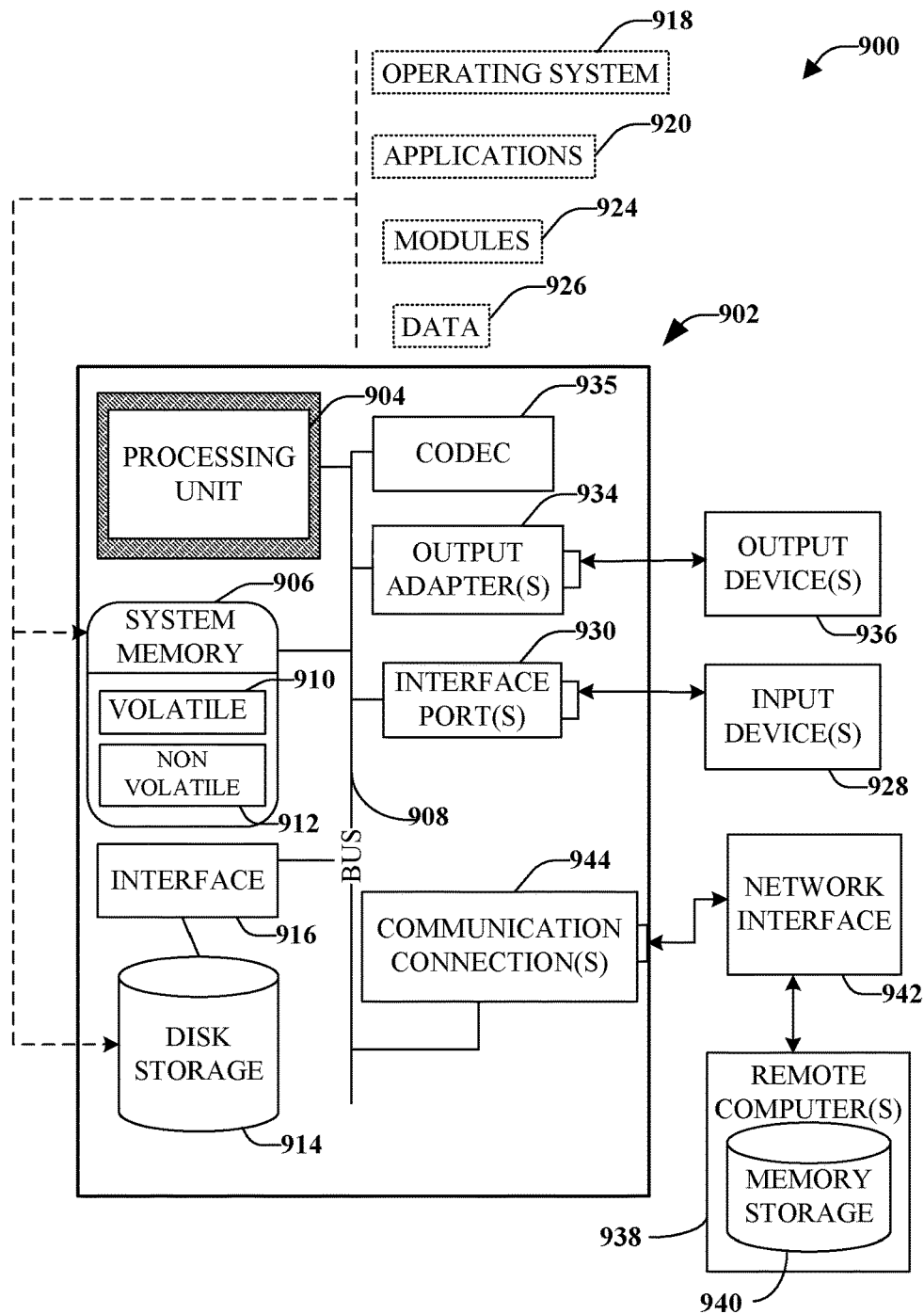
FIG. 9 illustrates an example schematic block diagram for a computing environment in accordance with certain embodiments of this disclosure.

With reference to FIG. 9, a suitable environment 900 for implementing various aspects of the claimed subject matter includes a computer 902. The computer 902 includes a processing unit 904, a system memory 906, a codec 935, and a system bus 908. The system bus 908 couples system components including, but not limited to, the system memory 906 to the processing unit 904. The processing unit 904 can be any of various available processors. Dual microprocessors and other multiprocessor architectures also can be employed as the processing unit 904.

The system bus 908 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI) or others now in existence or later developed.

The system memory 906 includes volatile memory 910 and non-volatile memory 912. The basic input/output system (BIOS), containing the basic routines to transfer information between elements within the computer 902, such as during start-up, is stored in non-volatile memory 912. In addition, according to present innovations, codec 935 may include at least one of an encoder or decoder, wherein the at least one of an encoder or decoder may consist of hardware, software, or a combination of hardware and software. Although, codec 935 is depicted as a separate component, codec 935 may be contained within non-volatile memory 912 or included in other components detailed herein. By way of illustration, and not limitation, non-volatile memory 912 can include read only memory (ROM), programmable ROM (PROM), electrically programmable ROM (EPROM), electrically erasable programmable ROM (EEPROM), or flash memory. Volatile memory 910 includes random access memory (RAM), which acts as external cache memory. According to present aspects, the volatile memory may store the write operation retry logic (not shown in FIG. 9) and the like. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM), resistive RAM (RRAM), or others now in existence or later developed.

Computer 902 may also include removable/non-removable, volatile/non-volatile computer storage medium. FIG. 9 illustrates, for example, disk storage 914. Disk storage 914 includes, but is not limited to, devices like a magnetic disk drive, solid state disk (SSD) floppy disk drive, tape drive, flash memory card, or memory stick. In addition, disk storage 914 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 914 to the system bus 908, a removable or non-removable interface is typically used, such as interface 916. It is appreciated that storage devices 914 can store information related to a user. Such information might be stored at or provided to a server or to an application running on a user device. In one embodiment, the user can be notified (e.g., by way of output device(s) 936) of the types of information that are stored to disk storage 914 and/or transmitted to the server or application. The user can be provided the opportunity to opt-in or opt-out of having such information collected and/or shared with the server or application (e.g., by way of input from input device(s) 928).

It is to be appreciated that FIG. 9 describes software that acts as an intermediary between users and the basic computer resources described in the suitable operating environment 900. Such software includes an operating system 918. Operating system 918, which can be stored on disk storage 914, acts to control and allocate resources of the computer system 902. Applications 920 take advantage of the management of resources by operating system 918 through program modules 924, and program data 926, such as the boot/shutdown transaction table and the like, stored either in system memory 906 or on disk storage 914. It is to be appreciated that the claimed subject matter can be implemented with various operating systems or combinations of operating systems.

A user enters commands or information into the computer 902 through input device(s) 928. Input devices 928 include, but are not limited to, a pointing device such as a mouse, stylus, touch pad, keyboard, microphone, joystick, game pad, satellite dish, scanner, TV tuner card, digital camera, digital video camera, web camera, and the like. These and other input devices connect to the processing unit 904 through the system bus 908 via interface port(s) 930. Interface port(s) 930 include, for example, a serial port, a parallel port, a game port, and a universal serial bus (USB). Output device(s) 936 use some of the same type of ports as input device(s) 928. Thus, for example, a USB port may be used to provide input to computer 902 and to output information from computer 902 to an output device 936. Output adapter 934 is provided to illustrate that there are some output devices 936 like monitors, speakers, and printers, among other output devices 936, which require special adapters. The output adapters 934 include, by way of illustration and not limitation, video and sound cards that provide a means of connection between the output device 936 and the system bus 908. It should be noted that other devices and/or systems of devices provide both input and output capabilities such as remote computer(s) 938.

Computer 902 can operate in a networked environment using logical connections to one or more remote computers, such as remote computer(s) 938. The remote computer(s) 938 can be a personal computer, a server, a router, a network PC, a workstation, a microprocessor based appliance, a peer device, a smart phone, a tablet, or other network node, and typically includes many of the elements described relative to computer 902. For purposes of brevity, only a memory storage device 940 is illustrated with remote computer(s) 938. Remote computer(s) 938 is logically connected to computer 902 through a network interface 942 and then connected via communication connection(s) 944. Network interface 942 encompasses wire and/or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 944 refers to the hardware/software employed to connect the network interface 942 to the bus 908. While communication connection 944 is shown for illustrative clarity inside computer 902, it can also be external to computer 902. The hardware/software necessary for connection to the network interface 942 includes, for exemplary purposes only, internal and external technologies such as, modems including regular telephone grade modems, cable modems and DSL modems, ISDN adapters, and wired and wireless Ethernet cards, hubs, and routers.

Figure 10:
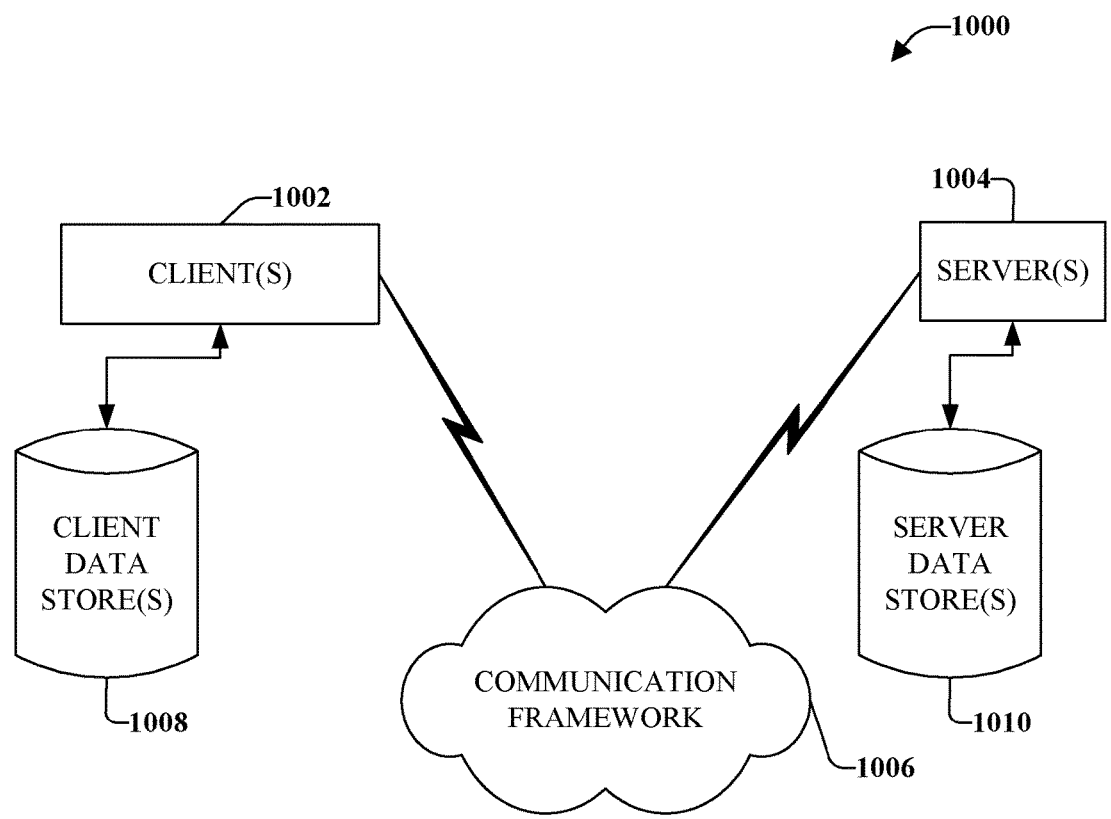
FIG. 10 illustrates an example block diagram of a computer operable to execute certain embodiments of this disclosure.

Referring now to FIG. 10, there is illustrated a schematic block diagram of a computing environment 1000 in accordance with this specification. The system 1000 includes one or more client(s) 1002 (e.g., laptops, smart phones, PDAs, media players, computers, portable electronic devices, tablets, and the like). The client(s) 1002 can be hardware and/or software (e.g., threads, processes, computing devices). The system 1000 also includes one or more server(s) 1004. The server(s) 1004 can also be hardware or hardware in combination with software (e.g., threads, processes, computing devices). The servers 1004 can house threads to perform transformations by employing aspects of this disclosure, for example. One possible communication between a client 1002 and a server 1004 can be in the form of a data packet transmitted between two or more computer processes wherein the data packet may include video data. The data packet can include a cookie and/or associated contextual information, for example. The system 1000 includes a communication framework 1006 (e.g., a global communication network such as the Internet, or mobile network(s)) that can be employed to facilitate communications between the client(s) 1002 and the server(s) 1004.

Communications can be facilitated via a wired (including optical fiber) and/or wireless technology. The client(s) 1002 are operatively connected to one or more client data store(s) 1008 that can be employed to store information local to the client(s) 1002 (e.g., cookie(s) and/or associated contextual information). Similarly, the server(s) 1004 are operatively connected to one or more server data store(s) 1010 that can be employed to store information local to the servers 1004.

In one embodiment, a client 1002 can transfer an encoded file, in accordance with the disclosed subject matter, to server 1004. Server 1004 can store the file, decode the file, or transmit the file to another client 1002. It is to be appreciated, that a client 1002 can also transfer uncompressed file to a server 1004 and server 1004 can compress the file in accordance with the disclosed subject matter. Likewise, server 1004 can encode video information and transmit the information via communication framework 1006 to one or more clients 1002.

The illustrated aspects of the disclosure may also be practiced in distributed computing environments where certain tasks are performed by remote processing devices that are linked through a communications network. In a distributed computing environment, program modules can be located in both local and remote memory storage devices.

Moreover, it is to be appreciated that various components described herein can include electrical circuit(s) that can include components and circuitry elements of suitable value in order to implement the embodiments of the subject innovation(s). Furthermore, it can be appreciated that many of the various components can be implemented on one or more integrated circuit (IC) chips. For example, in one embodiment, a set of components can be implemented in a single IC chip. In other embodiments, one or more of respective components are fabricated or implemented on separate IC chips.

What has been described above includes examples of the embodiments of the present invention. It is, of course, not possible to describe every conceivable combination of components or methodologies for purposes of describing the claimed subject matter, but it is to be appreciated that many further combinations and permutations of the subject innovation are possible. Accordingly, the claimed subject matter is intended to embrace all such alterations, modifications, and variations that fall within the spirit and scope of the appended claims. Moreover, the above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize. Moreover, use of the term "an embodiment" or "one embodiment" throughout is not intended to mean the same embodiment unless specifically described as such.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

The aforementioned systems/circuits/modules have been described with respect to interaction between several components/blocks. It can be appreciated that such systems/circuits and components/blocks can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function; software stored on a computer readable medium; or a combination thereof.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Computing devices typically include a variety of media, which can include computer-readable storage media and/or communications media, in which these two terms are used herein differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal that can be transitory such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

What is claimed is:

1. A method for accessing content, the method comprising:
   determining, using a hardware processor, that media content in a content request received from a first user account associated with a first user is designated as premium media content in which access privileges are needed to access the media content and that the first user account is not associated with the access privileges;
   determining, using the hardware processor, that a relationship exists between the first user account associated with the first user and a plurality of additional user accounts associated with other users;
   in response to determining that a relationship exists between the first user account associated with the first user and the plurality of additional user accounts associated with the other users, determining, using the hardware processor, whether a second user account associated with a second user from the plurality of additional user accounts has the access privileges needed to access the premium media content; and
   causing, using the hardware processor, the premium media content to be presented on a device associated with the first user account associated with the first user in response to the second user account associated with the second user extending the access privileges to the first user account.

2. The method of claim 1, further comprising inhibiting a denial of the request to access the premium media content from occurring in response to determining that the first user account is restricted from accessing the media content based on the access privileges associated with the first user account and authorizing the request from the first device with the access privileges needed to access the premium media content based on the relationship.

3. The method of claim 1, further comprising receiving, from the device associated with the first user account, a request to access media content from a content provider, wherein an authorization of the request is performed in response to a count of a number of authorizations being less than or equal to a defined maximum threshold.

4. The method of claim 3, wherein the request is authorized with a restriction that a portion of the premium content is not accessible in response to the count being greater than the defined maximum threshold.

5. The method of claim 3, wherein the request is authorized in response to receiving a selection of the first user account indicated by input received from a second device associated with the second user account.

6. The method of claim 3, wherein the request is authorized in response to a timer associated with a redemption period being unexpired.

7. The method of claim 1, further comprising causing watch history data representing a history of premium media content for which the second user account has the access privileges to be presented on the device associated with the first user account.

8. The method of claim 1, further comprising providing an incentive associated with the premium media content to a second device associated with the second user account in response to a payment transaction associated with the premium media content received from the device associated with the first user account.

9. The method of claim 1, further comprising inserting a token into uniform resource locator data representing a link to the premium media content, wherein the token includes identification data that identifies the second user account.

10. A system for accessing content, the system comprising:
   a hardware processor that is configured to:
      determine that media content in a content request received from a first user account associated with a first user is designated as premium media content in which access privileges are needed to access the media content and that the first user account is not associated with the access privileges;
      determine that a relationship exists between the first user account associated with the first user and a plurality of additional user accounts associated with other users;
      in response to determining that a relationship exists between the first user account associated with the first user and the plurality of additional user accounts associated with the other users, determine whether a second user account associated with a second user from the plurality of additional user accounts has the access privileges needed to access the premium media content; and
      cause the premium media content to be presented on a device associated with the first user account associated with the first user in response to the second user account associated with the second user extending the access privileges to the first user account.

11. The system of claim 10, wherein the hardware processor is further configured to:
   inhibit a denial of the request to access the premium media content from occurring in response to determining that the first user account is restricted from accessing the media content based on the access privileges associated with the first user account and authorizing the request from the first device with the access privileges needed to access the premium media content based on the relationship.

12. The system of claim 10, wherein the hardware processor is further configured to receive, from the device associated with the first user account, a request to access media content from a content provider, wherein an authorization of the request is performed in response to a count of a number of authorizations being less than or equal to a defined maximum threshold.

13. The system of claim 12, wherein the request is authorized with a restriction that a portion of the premium content is not accessible in response to the count being greater than the defined maximum threshold.

14. The system of claim 12, wherein the request is authorized in response to receiving a selection of the first user account indicated by input received from a second device associated with the second user account.

15. The system of claim 12, wherein the request is authorized in response to a timer associated with a redemption period being unexpired.

16. The system of claim 10, wherein the hardware processor is further configured to cause watch history data representing a history of premium media content for which the second user account has the access privileges to be presented on the device associated with the first user account.

17. The system of claim 10, wherein the hardware processor is further configured to provide an incentive associated with the premium media content to a second device associated with the second user account in response to a payment transaction associated with the premium media content received from the device associated with the first user account.

18. The system of claim 10, wherein the hardware processor is further configured to insert a token into uniform resource locator data representing a link to the premium media content, wherein the token includes identification data that identifies the second user account.

19. A non-transitory computer-readable medium containing computer-executable instructions that, when executed by a hardware processor, cause the process to perform a method for access content, the method comprising:
   determining that media content in a content request received from a first user account associated with a first user is designated as premium media content in which access privileges are needed to access the media content and that the first user account is not associated with the access privileges;
   determining that a relationship exists between the first user account associated with the first user and a plurality of additional user accounts associated with other users;
   in response to determining that a relationship exists between the first user account associated with the first user and the plurality of additional user accounts associated with the other users, determining whether a second user account associated with a second user from the plurality of additional user accounts has the access privileges needed to access the premium media content; and
   causing the premium media content to be presented on a device associated with the first user account associated with the first user in response to the second user account associated with the second user extending the
access privileges to the first user account.

\* \* \* \* \*